March 2, 1965  J. A. FEHR, JR  3,172,013

NO-LOAD DISCONNECT BUSWAY SWITCHING APPARATUS

Filed May 11, 1962  2 Sheets-Sheet 1

INVENTOR:
JOSEPH A. FEHR, JR.
BY Irving H. Marchman
ATTORNEY.

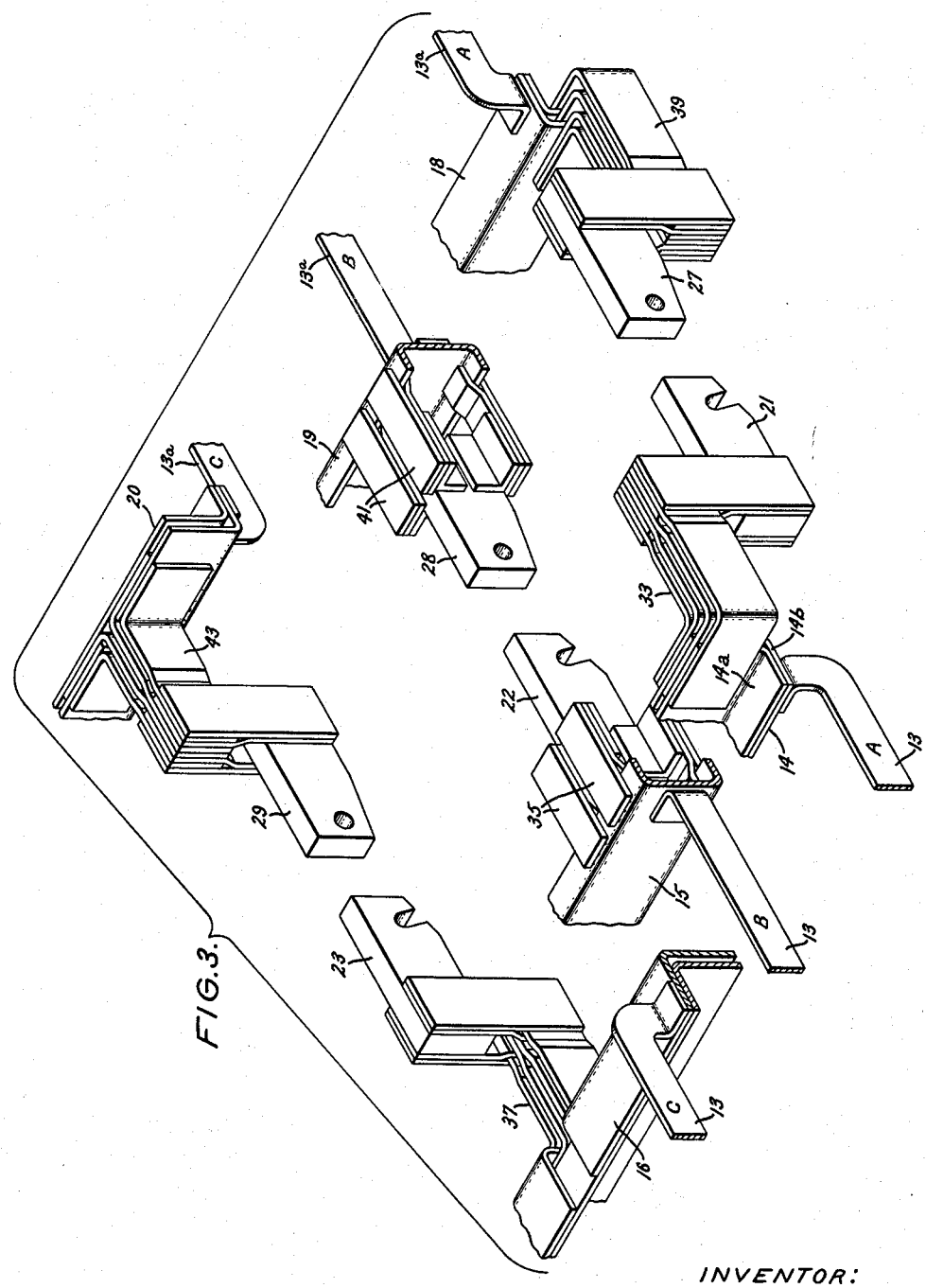

United States Patent Office 3,172,013
Patented Mar. 2, 1965

3,172,013
NO-LOAD DISCONNECT BUSWAY SWITCHING APPARATUS
Joseph A. Fehr, Jr., Simsbury, Conn., assignor to General Electric Company, a corporation of New York
Filed May 11, 1962, Ser. No. 194,096
6 Claims. (Cl. 317—115)

This invention relates to electric power distribution apparatus and more particularly low voltage distribution busways, and it has for an object the provision of a simple, reliable and improved power distribution apparatus of this character.

In the utilization of such busways, it is sometimes necessary to disconnect a portion of the busway from another portion so as to deenergize the disconnected portion. Since busway systems are ordinarily employed to carry large currents, e.g., up to 6,000 amperes or more, disconnect switches used in the past for such applications have been large, bulky and expensive. Accordingly, a further object of the invention is the provision of a no-load disconnect switching means for busway use that is small, compact and relatively inexpensive.

Another object of the invention is the provision of busway disconnect switching means which, when closed and carrying current, exhibits relatively low reactance and thus is able to carry high values of current without unacceptably high temperature rise.

Still another object of the invention is the provision of busway no-load disconnect switching means that maintains good phase current and phase voltage balance and hence good current distribution through the switch.

Stated briefly, in accordance with the invention, there is provided a busway switch including an enclosure, a group of parallel line busbar conductors and a corresponding group of load busbars. The group of line busbars comprises a multiplicity of bars for connection to a multiphase source and the load group comprises an equal number of busbars for connection to a suitable load. For disconnecting the load busbars from the line busbars, a suitable multiphase switch is provided having a number of poles that is a multiple of the number of phases and that is substantially less than the total number of line busbar conductors. Each pole of the switch is provided with a line stud and a load stud. The line busbars and the load busbars are phase collected by means of pluralities of line phase collectors bars and load phase collector bars. A number of connections are provided between each line phase collector bar and an equal number of corresponding line switch studs and likewise a number of connections are provided between each load phase collector bar and an equal number of corresponding load studs of the switch.

In another aspect of the invention the connections from the line studs to the line phase collector bars are made to provide a pattern of currents of recurring phase sequence through the switch.

For a better and more complete understanding of the invention reference should now be had to the following specification and to the accompanying drawings in which:

FIG. 3 is a view in perspective on an enlarged scale of a portion of the apparatus of FIGS. 1 and 2.

Figure 1:
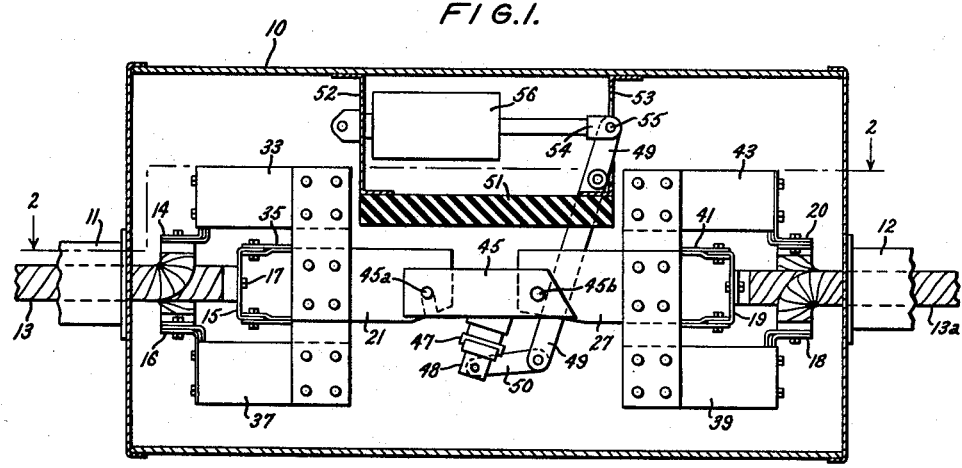
FIG. 1 is a view in side elevation of apparatus embodying the invention with the sidewall of its enclosure removed.

Referring now to the drawings, the invention is illustrated as incorporated in busway disconnect switching apparatus having a generally rectangular main enclosure 10 that is mounted and secured between intermediate terminal portions 11 and 12 of the housing of a low voltage distribution busway. The portion 11 is considered to be the line end of the switching apparatus and the portion 12 is considered to be the load end.

Figure 2:
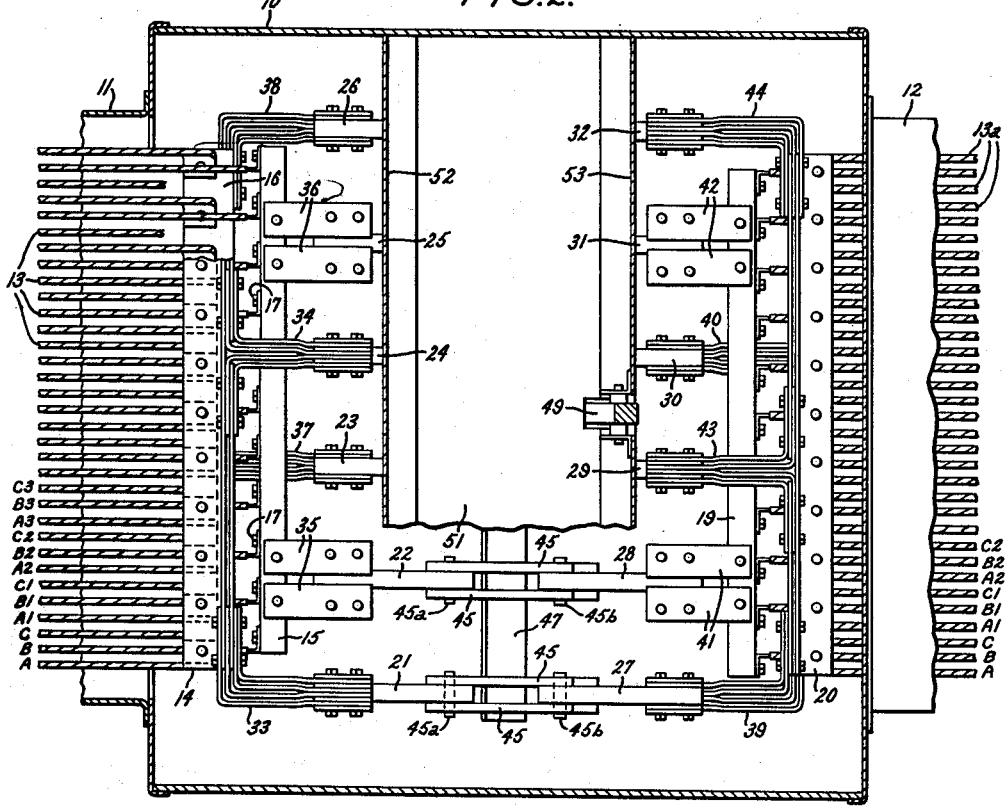
FIG. 2 is a plan view in section taken on the line 2—2 of FIG. 1 looking in the direction of the arrows.

A multiplicity of parallel bar conductors 13 are supported in spaced-apart broad side relationship in the busway housing section 11 by suitable insulating supporting means (not shown). In the utilization of the apparatus, each of these conductors 13 will be connected in the proper phase of a multiphase source. A total of 33 such busbar conductors 13 are illustrated in FIG. 2. Assuming the source to be a 3-phase source having phases A, B and C there will be eleven bus bar conductors per phase, although the number could be greater or less than eleven. The entire 33 busbars are arranged within the duct in the recurring phase sequence order A, B, C, A1, B1, C1, A2, B2, C2, etc., that is illustrated in FIG. 2. This arrangement is also quite generally known as an "interlaced" or interleaved" arrangement.

Within the enclosure 10, the busbars 13 are phase collected by suitable means such as the phase collector busbars 14, 15 and 16. The phase collector bar 14, illustrated as comprising two angles bars 14a and 14b (FIGS. 1 and 3) extends transversely of the longitudinal axes of the busbars 13. All of the line A-phase busbars 13 are electrically connected in a suitable manner to phase collector bar 14. As seen in FIG. 3 the end of the single A-phase busbar 13 therein illustrated is given a 90° edgewise band in the same plane and a 90° flatwise bend out of the plane and the flat surface of the latter bent over portion is secured to the A-phase collector bar 14 by any suitable means that will maintain it in good mechanical and electrical contact therewith.

The phase collector bar 15 of the B-phase busbar conductors 13 is illustrated as a channel bar structure extending transversely of the longitudinal axes of the busbars. As illustrated in the drawings, each of the B-phase busbar conductors 13 has a single 90-degree flatwise bend near its end to enable it to present a flat surface to the B-phase collector channel bar 15 to which it is secured in good mechanical and electrical contact by suitable means such as bolts 17. The phase collector bar 16 for the C-phase busbar conductors 13 is similar to the A-phase collector bar; it comprises two angle bars extending transversely of the busbars and to it are securely fastened all of the C-phase busbar conductors 13. Owing to the upward right angle edgewise bend in the A-phase busbars and the downward right angle edgewise bend in the C-phase busbars, the phase collector bars 14, 15 and 16 occupy planes that are spaced apart from each other. In the above description, the terms "upward" and "downward" are relative only.

At its load end the switching apparatus is provided with phase collector bars 18, 19 and 20 for connection to the A-phase, B-phase and C-phase load busbars 13a respectively. As seen in FIGS. 1, 2 and 3, the phase collector bar structure at the load end of the switching apparatus is generally similar to that at the line end. However, the construction at both ends is not symmetrical since the directions of the right angle edgewise bend of the A-phase bars and of the C-phase bars at the load end are reverse of the directions of the edgewise bends in the corresponding phase collector bars at the line end.

Between the two sets of phase collection bars 14, 15 and 16, and 18, 19 and 20 is mounted a multiphase, multipole switching device having a number of poles that is a multiple of the number of phases. As illustrated in the drawing, the switch is a 3-phase, 6-pole switch, i.e., two poles per phase. Each pole of the switch is provided with a line stud and with a load stud. Thus the switch has line studs 21, 22, 23, 24, 25 and 26, and load studs 27, 28, 29, 30, 31 and 32. From each line phase collector bar current is carried in two paths to two corresponding line studs of the switch. Thus as shown in FIG. 2, the line A-phase collector bar 14 is connected by means of busbar connections 33 and 34 to corresponding line studs 21 and 24. Similarly the line B-phase collector bar 15 is connected by means of connections 35 and 36 to corresponding line studs 22 and 25 and the line C-phase collector bar 16 is connected by means of connections 37 and 38 to corresponding line studs 23 and 26 respectively. Thus the line studs have interleaved or recurring phase sequence A, B, C, A1, B1, C1.

At the load end, the connection pattern of the phase collector bars to the switch studs is similar to the above-described connection pattern at the line end. As shown in FIGS. 1 and 2 the load A-phase collector bar 18 is connected by means of connections 39 and 40 to corresponding load studs 27 and 30 respectively; the load B-phase collector bar 19 is connected by means of connections 41 and 42 to corresponding load studs 28 and 31 respectively and the load C-phase collector bar 20 is connected by means of connections 43 and 44 to load studs 29 and 32 respectively. For bridging each line stud and its corresponding load stud, twelve movable switch blade bars, two per pole, are pivotally mounted on the load studs. In the drawing, only two switch blades 45 for bridging line studs 21 and 22 and load studs 27 and 28, respectively, are illustrated. As shown, each comprise two spaced apart bolted pressure bars, i.e., a bolt 45a passes through the two bars and is tightened to the point at which it permits just enough separation of the bars to insure their being forcibly pressed against the adjacent lateral surfaces of the line studs. Similarly bolt 45b insures that the two pressure bars are forcibly pressed against the adjacent lateral surfaces of the load studs.

Owing to the connection of the line phase collector bars to the line studs 21, 22, 23, 24, 25 and 26 of the switch in the interlaced phase pattern A, B, C, A1, B1, C1 the phase currents in the switch poles will have the same interlaced pattern when the switch is closed and carrying current. This minimizes the reactance of the switch and the voltage drop. It also balances the current between inner and outer bars and maintains phase current and voltage balance through the switch thus enabling it to carry a large current at an acceptable temperature rise.

In addition, the phase collection of the bus bar conductors and interlaced pattern of the phases in the switch poles results in a switch of much greater compactness than has been obtainable in conventional busway disconnect switches and thus results in saving of material and in space conservation which are highly important considerations in busway apparatus.

For opening and closing the switch blades, a plurality of toggles (not shown) one for each blade, are provided. All six toggles are secured to and driven by a tie bar 47. A swivel 48 on the tie bar is linked to an operating lever 49 by means of a connecting rod 50. The lever 49 is pivotally mounted on insulating base member 51 that is supported on the switch enclosure housing 10 by means of supporting brackets 52 and 53. The remote end of the lever 49 is connected by means of a clevis 54 and pin 55 to the plunger of an air cylinder 56 that is preferably of the single-ended double-acting type. In FIGS. 1 and 2 of the drawing the switch is illustrated in its closed position as a result of operation of the air cylinder plunger to its extended position. When the plunger is retracted, the lever 49, acting through the connecting rod 50 drives the swivel and tie bar to the right to open the switch blades. The air cylinder may be remotely operated by pushbuttons (not shown) which operate a solenoid valve (not shown) for controlling the supply of pressure fluid, preferably air, to the cylinder. Electrical control of the operation of the switch makes for convenience in interlocking the switch with a circuit breaker or other equipment. Preferably the switch is oriented face down or face up so that it is disposed parallel to the bus run and therefore occupies a minimum of vertical space.

Although this invention has been described as embodied in a specific structure, it will be understood that the invention is not limited thereto since alterations and modifications will readily suggest themselves to persons skilled in the art without departing from the true spirit of the invention or from the scope of the annexed claims.

What I claim as new and desire to secure by United States Letters Patent is:

1. A no-load disconnect busway switching apparatus comprising:
    (a) an elongated switch enclosure having opposed side walls, opposed top and bottom walls and opposed first and second end walls,
    (b) a first opening in one of said end walls and a second opening in the other of said end walls,
    (c) a set of line bus bars for connection to a multiphase source comprising a plurality of line bus bars for each phase of said source, said bus bars being disposed in side by side parallel relationship and having end portions extending through said first opening into said enclosure,
    (d) a set of load bus bars comprising a plurality of load bus bars for each phase of said source, said load bus bars being disposed in side by side parallel relationship and having end portions extending through said second opening into said enclosure,
    (e) a multipole no-load disconnect switch disposed within said enclosure at an intermediate location between said end walls, said switch having a number of poles that is a multiple of the number of phases of the source and is less than the total number of said line bus bars,
    (f) each of the poles of said switch having a line stud and a load stud,
    (g) a group of line phase collector bars disposed in the space between said switch and said first end wall, one collector bar for each of said phases and each connected to all of said line bus bars of a corresponding phase,
    (h) a plurality of connections from each of said phase collector bars to a plurality of corresponding line studs,
    (i) a group of load phase collector bars, one for each of said phases, disposed in the space between said switch and said second end wall and each connected to all of said load bus bars of corresponding phase and
    (j) a plurality of connections from each of said load phase collector bars to corresponding load studs of said switch.

2. The power distribution apparatus of claim 1 in which the connections from the phase collector bars on the line side of the switch to the line studs of the switch provide recurring phase sequence of the currents through the poles of said switch.

3. A no-load disconnect busway switching apparatus comprising:
    (a) an elongated switch enclosure having opposed side walls, opposed top and bottom walls and opposed first and second end walls,
    (b) a first opening in one of said end walls and a second opening in the other of said end walls,
    (c) a set of line bus bars for connection to a multiphase source comprising a plurality of line bus bars for each phase of said source, said bus bars being disposed in side by side parallel relationship and having end portions extending through said first opening into said enclosure,
    (d) a set of load bus bars disposed in side by side parallel relation and having end portions extending through said second opening into said enclosure,
    (e) a multipole no load disconnect switch disposed within said enclosure at an intermediate location between said end walls, said switch having a number of poles that is a multiple of the number of phases of the source and is less than the total number of said line bus bars.

(f) each of the poles of said switch having a line stud and a load stud, (g) an assembly of line phase collector bars disposed in the space between said switch and said first end wall, one bar for each of said phases and each connected to all of said line bus bars of a corresponding phase.

(h) an assembly of load phase collector bars in the space between said switch and said second end wall, one bar for each of said phases and each connected to all of said load bus bars of a corresponding phase, (i) the bars of each of said assemblies extending transversely to the longitudinal axis of said enclosure and disposed in spaced apart planes generally parallel to the planes of said top and bottom walls, (j) electrical connections from each of said line phase collector bars in said first assembly to corresponding line studs of said switch and (k) electrical connections from each of said load phase collector bars to corresponding load studs of said switch.

4. The electric power distribution apparatus of claim 3 in which the connections from the phase collector bars on the line side of the switch to the line studs provide recurring phase sequence of the currents through the poles of said switch.

5. A no-load disconnect busway switching apparatus comprising:

(a) an elongated switch enclosure having opposed side walls, opposed top and bottom walls and opposed first and second end walls, (b) a first opening in one of said end walls and a second opening in the other of said end walls, (c) a multiplicity of parallel spaced apart line bus bars for connection to a multiphase source comprising at least three bus bars per phase, all of said bars being arranged in recurring phase sequence and the end portions of said bars extending through said first opening into said enclosure, (d) a multipole no-load disconnect switch disposed within said enclosure at an intermediate location between said end walls, said switch having a number of poles that is a multiple of the number of phases of the source and is less than the total number of said bars, (e) each of the poles of said switch having a line stud, a load stud, and a switch blade pivotally mounted on one of said studs, (f) an assembly of line phase collector bars, disposed in the space between said switch and said first end wall, one bar for each of said phases and each connected to all of said line bus bars of a corresponding phase, (g) a number, equal to said multiple, of connections from each of said phase collector bars to an equal number of corresponding line studs arranged in recurring phase sequence to provide recurring phase sequence of the currents through the poles of said switch, (h) a plurality of parallel spaced apart load bus bars greater than the number of said switch poles, (i) an assembly of load phase collector bars disposed in the space between said switch and said second end wall, one bar for each of said phases and each connected to all of said load bus bars of a corresponding phase, (j) the bars of each of said assemblies extending transversely to the longitudinal axis of said enclosure and disposed in spaced apart planes generally parallel to the planes of said top and bottom walls, (k) a number, equal to said multiple, of connections from each of said collector bars of said second assembly to an equal number of corresponding load studs of said switch, (l) said bus bars, said line and load studs and said switch blades being arranged in generally coplanar relationship, and (m) a switch operating device mounted within said enclosure on one of the longitudinally extending walls thereof at an intermediate point between said end walls and having a mechanical connection to said blades for operating said blades between open and closed position.

6. The power distribution apparatus of claim 1 wherein the line phase collector bus bars and the load phase collector bus bars are arranged in spaced apart planes parallel to the planes of the top and bottom walls of said enclosure.

References Cited by the Examiner
UNITED STATES PATENTS

| | | | |
|---|---|---|---|
| 1,162,553 | 11/15 | Bergmann | 317—99 |
| 1,551,275 | 8/25 | Wagner et al. | 174—32 |
| 1,979,683 | 11/34 | Graves et al. | 317—103 |

E. JAMES SAX, *Primary Examiner.*

JOHN F. BURNS, *Examiner.*